United States Patent [19]

Guo et al.

[11] Patent Number: 5,420,216

[45] Date of Patent: May 30, 1995

[54] PROCESS FOR MAKING ALLYL POLYMERS AND COPOLYMERS

[75] Inventors: Shao-Hua Guo, West Goshen; Robert G. Gastinger, West Chester, both of Pa.

[73] Assignee: Arco Chemical Technology, L.P., Greenville, Del.

[21] Appl. No.: 254,808

[22] Filed: Jun. 6, 1994

[51] Int. Cl.6 .......................... C08F 2/02; C08F 4/04; C08F 4/34
[52] U.S. Cl. ........................ 526/86; 526/314; 526/316; 526/320; 526/326; 526/332
[58] Field of Search ............... 526/79, 86, 314, 316, 526/320, 326, 332

[56] References Cited

U.S. PATENT DOCUMENTS

| | | | |
|---|---|---|---|
| 2,904,541 | 9/1959 | Barrett | 260/80 |
| 3,268,561 | 8/1966 | Peppel et al. | 260/348 |
| 3,325,453 | 6/1967 | Lim et al. | 260/63 |
| 3,957,699 | 5/1976 | Solomon et al. | 526/90 |
| 4,618,703 | 10/1986 | Thanawalla et al. | 560/209 |

OTHER PUBLICATIONS

Kirk–Othmer, *Encyclopedia of Chemical Technology*, (1982) vol. 2 "Allyl Monomers & Polymers".
Sandler et al. *Polymer Syntheses*, (1980), vol. III, Chap. 8, "Polymerization of Allyl Esters".

*Primary Examiner*—Joseph L. Schofer
*Assistant Examiner*—Tom Weber
*Attorney, Agent, or Firm*—Jonathan L. Schuchardt

[57] ABSTRACT

An improved process for making allyl polymers and copolymers is disclosed. Conversions of the allyl monomers are substantially increased by adding the free-radical initiator gradually during the polymerization. The process is particularly useful for making polymers and copolymers from common allyl monomers such as allyl alcohol, allyl acetate, and propoxylated allyl alcohol.

22 Claims, No Drawings

PROCESS FOR MAKING ALLYL POLYMERS AND COPOLYMERS

FIELD OF THE INVENTION

The invention relates to processes for making allyl polymers and copolymers. In particular, the invention is a process for making allyl polymers and copolymers in high yields compared with conventional processes for making allyl polymers and copolymers.

BACKGROUND OF THE INVENTION

Allyl monomers such as allyl alcohol and allyl acetate are well known. Allyl alcohol is readily available, for example, by isomerizing propylene oxide in the presence of a lithium phosphate catalyst. Allyl alcohol has been widely used to make certain allyl derivatives such as diallyl phthalate and diethylene glycol bis(allyl carbonate). Heating allyl monomers in the presence of free-radical initiators commonly gives products of relatively low molecular weight. In addition, allyl monomers are quite unreactive compared with other ethylenically unsaturated monomers. Typically, attempted polymerizations result in slow reactions and low monomer conversions. (See: Kirk-Othmer, *Encyclopedia of Chemical Technology*, (1982), Volume 2, "Allyl Monomers and Polymers," pp. 109-128.)

Polymers made by polymerizing allyl monomers such as allyl alcohol, allyl acetate, methallyl alcohol, and propoxylated allyl alcohol are generally not commercially available. Poly(allyl alcohol) is known, but its usefulness is rather limited by its poor solubility in most common organic solvents. Usually, allyl polymers are made by charging the allyl monomer and a free-radical initiator to a reactor, and heating the mixture at a temperature effective to polymerize the monomer. All of the free-radical initiator is charged at the start of the polymerization. Conversions of allyl monomer to polymer obtained by this process are typically less than about 20%. The polymerization of allyl acetate in bulk as described in Sandler et al., *Polymer Syntheses*, (1980), Volume III, Chapter 8, "Polymerization of Allyl Esters," pp. 263-266, illustrates processes used to polymerize allyl monomers.

Still needed in the art are improved processes for making allyl polymers and copolymers. A preferred process would give higher conversions of the relatively unreactive allyl monomers to reduce the need for recycling unreacted monomers. Ideally, the process would be cost-effective and easy to perform.

SUMMARY OF THE INVENTION

The invention is an improved process for making allyl polymers and copolymers. The process comprises polymerizing an allyl monomer at a temperature within the range of about 80° C. to about 280° C. in the presence of a free-radical initiator. The key to the invention is to add most or all of the initiator gradually to the reaction mixture during the polymerization. Gradual addition of the free-radical initiator surprisingly results in much higher conversions of the allyl monomer (200-300% increase) compared with the conversions obtained when all of the initiator is charged at the start of the polymerization.

The invention is particularly useful for polymerizing or copolymerizing readily available allyl monomers such as allyl alcohol, methallyl alcohol, allyl acetate, allyl butyrate, propoxylated allyl alcohols, diallyl phthalate, and other allyl monomers.

DETAILED DESCRIPTION OF THE INVENTION

The invention is a process for polymerizing an allyl monomer. Allyl monomers generally useful in the invention have at least one $CH_2=CR-CH_2-$ group where R is hydrogen or an alkyl group. Preferred allyl monomers have the structure: $CH_2=CR-CH_2-X$ in which R is hydrogen or a $C_1-C_{10}$ alkyl group, and X is a monovalent radical selected from the group consisting of -OH, -OR', -O-CO-R', -O-CO$_2$-R', -(OA)$_n$-OH, -(OA)$_n$-OR', -(OA)$_n$-O-CO-R', and -(OA)$_n$-O-CO$_2$-R' in which R' is a $C_1-C_{10}$ alkyl or $C_6-C_{12}$ aryl group, OA is a $C_2-C_4$ oxyalkylene diradical, and n has a value within the range of about 1 to 5.

Suitable allyl monomers include, for example, allyl alcohol, methallyl alcohol, allyl acetate, allyl butyrate, allyl benzoate, methyl allyl ether, propoxylated allyl alcohols, acetate esters of propoxylated allyl alcohols, and the like, and mixtures thereof. Particularly preferred are allyl alcohol, methallyl alcohol, allyl acetate, allyl butyrate, propoxylated allyl alcohols, and mixtures thereof. Minor amounts of multifunctional allyl compounds, such as diallyl ether, diallyl phthalate, and the like, can also be included in the polymerizations.

Suitable propoxylated allyl alcohols can be made by reacting allyl alcohol with up to 5 equivalents of propylene oxide in the presence of a basic catalyst as described, for example, in U.S. Pat. Nos. 3,268,561 and 4,618,703, the teachings of which are incorporated herein by reference. Preferred propoxylated allyl alcohols have an average of less than about 2 oxypropylene units.

The process is performed in the presence of a free-radical initiator. Suitable free-radical initiators are the peroxide and azo-type initiators well known to those skilled in the art. Peroxide initiators are preferred. Examples include hydrogen peroxide, benzoyl peroxide, di-tert-butylperoxide, tert-butylhydroperoxide, tert-butylperbenzoate, azobis(isobutyronitrile) (AIBN), and the like. Particularly preferred are di-tert-butylperoxide and tert-butylhydroperoxide.

The free-radical initiator is used in an amount effective to polymerize the allyl monomer. The actual amount used varies depending upon many factors, including which free-radical initiator is used, which allyl monomers are present, reaction temperature, desired reaction time, the desired molecular weight and functionality of the polymer, and other factors. Generally, the total amount of freeradical initiator used is greater than about 3 wt. % based on the total weight of polymerizable monomers. Preferably, an amount within the range of about 3 wt. % to about 35 wt. % based on the total weight of polymerizable monomers is used; a more preferred range is from about 5 Wt. % to about 25 wt. %.

The reaction is performed at any temperature effective to cause free-radical polymerization. An accelerator can be used to lower the required reaction temperature if desired. Generally, it is preferred to perform the process at a temperature within the range of about 80° C. to about 280° C. A more preferred range is from about 90° C. to about 200° C.; most preferred is the range from about 135° C. to about 165° C.

The polymerization can be performed at any suitable pressure. Generally, it is preferred to perform the polymerization at pressures greater than about 1 atmosphere, particularly when relatively volatile allyl monomers such as allyl alcohol and allyl acetate are used. Particularly preferred is the pressure range from about 20 to about 500 psi.

Optionally, a solvent is included in the polymerization. Suitable solvents are those in which the monomers, free-radical initiator, and polymeric reaction products are soluble. Preferred solvents for the polymerization include alcohols, ethers, esters, glycols, glycol ethers, and glycol ether esters.

The process of the invention provides a way to make allyl polymers and copolymers in good yields. The molecular weights and functionalities of the polymers produced will depend on many factors, including, for example, which allyl monomers are used, whether or not a solvent is used, whether or not a multifunctional allyl monomer (such as diallyl phthalate) is included, reaction temperature and time, and other considerations. The number average molecular weights of the polymers produced by the process of the invention will generally be within the range of about 300 to about 30,000, preferably from about 500 to about 5000.

The key to the invention is to add most or all of the free-radical initiator gradually to the reaction mixture during the polymerization. By "most," we mean at least about 50% of the total amount of initiator to be used. Gradual addition of the initiator surprisingly results in much higher conversion of the allyl monomer (200–300% increase) compared with the conversions obtained in the conventional process, in which all of the initiator is normally charged at the start of the polymerization.

Gradual addition of the free-radical initiator is accomplished in any desired way. The initiator can be combined with a portion of the allyl monomer(s) and added, or it can be added by itself or as a separate solution. The addition can be incremental, continuous, semi-continuous, or gradient.

It is generally preferred to gradually introduce at least about 75% of the initiator to be used; i.e., up to about 25% of the initiator can be charged at the start of the polymerization. More preferably, at least about 90% of the initiator to be used is gradually introduced during the course of the polymerization.

An important consequence of gradual addition of the free-radical initiator is that the conversion of allyl monomer increases substantially-commonly at least about 25%-compared with a process in which all of the initiator is charged at the start of the polymerization. Conversion of the allyl monomer can be 50% to 200% greater or more when the process of the invention is used compared with conversion obtained from a process in which all of the initiator is initially charged to the reactor.

The following examples merely illustrate the invention. Those skilled in the art will recognize many variations that are within the spirit of the invention and scope of the claims.

Example 1: Preparation of Allyl Alcohol/Propoxylated Allyl Alcohol Copolymer: Gradual Addition of the Initiator A one-liter stainless-steel reactor equipped with a mechanical stirrer, steam heating jacket, temperature controller, and inlets for nitrogen and vacuum, is charged with propoxylated allyl alcohol (average of 1.0 oxypropylene units, 134 g) and allyl alcohol (134 g). The reactor is heated to 150° C., and di-tert-butylperoxide (55 g) is added to the reactor continuously over 2.5 h. Heating continues at 165° C. for 0.5 h after completing the peroxide addition. The mixture is vacuum stripped to remove most of the unreacted monomer, and is then stripped in the presence of water (2%) to remove traces of unreacted monomer at a maximum temperature of 165° C. A copolymer of allyl alcohol and propoxylated allyl alcohol (149 g) is isolated and characterized. The yield obtained is 56% based on the weight of charged monomers.

Comparative Example 2: Preparation of Allyl Alcohol/Propoxylated Allyl Alcohol Copolymer: All of the Initiator Charged at the Start of the Polymerization The procedure of Example 1 is generally followed, except that all of the required di-tert-butylperoxide (55 g) is added at the start of the polymerization. The reactor is charged with propoxylated allyl alcohol (average of 1.0 oxypropylene units, 200 g) and allyl alcohol (200 g). The reactor is heated to 155° C. for 6.5 h. The product is stripped as described above at a maximum of 165° C. to remove unreacted monomers. A copolymer of allyl alcohol and propoxylated allyl alcohol (69 g) is isolated and characterized. The yield obtained is 17% based on the weight of charged monomers.

The results of Example 1 and Comparative Example 2 demonstrate that higher yields of copolymers result when the free-radical initiator is gradually added during the course of the polymerization.

Example 3: Preparation of Allyl Alcohol/Allyl Acetate Copolymer:

Gradual Addition of the Initiator

The procedure of Example 1 is generally followed. The reactor is initially charged with allyl alcohol (200 g), allyl acetate (200 g), and di-tert-butylperoxide (10 g). After heating the reactor contents to 150° C., the remaining di-tertbutylperoxide (40 g) is added to the reactor continuously over 2.5 h. Heating continues for an additional 2 h at 150° C. After vacuum stripping as described above, the product (166 g) is isolated and characterized. The yield obtained is 42% based on the weight of charged monomers. Gel permeation chromatography (GPC) results: $Mw=1081$, $Mn=708$, $Mw/Mn=1.52$. By $^{13}C$ NMR, the product contains 57 mole % of allyl alcohol recurring units, and 43 mole % of allyl acetate recurring units.

Comparative Example 4: Preparation of Allyl Alcohol/Allyl Acetate Copolymer:

All of the Initiator Charged at the Start of the Polymerization

The procedure of Example 3 is followed, except that all of the di-tert-butylperoxide (50 g) is added at the start of the polymerization. After vacuum stripping of monomers in the usual way, the product (65 g) is isolated and characterized. The yield obtained is 16% based on the weight of charged monomers. GPC results: $Mw=1220$, $Mn=801$, $Mw/Mn=1.52$. By $^{13}C$ NMR, the product contains 62 mole % of allyl alcohol recurring units, and 38 mole % of allyl acetate recurring units.

The results of Example 3 and Comparative Example 4 also demonstrate that higher yields of copolymers result when the free-radical initiator is gradually added during the course of the polymerization.

Example 5. Preparation of Poly(allyl alcohol): Gradual Addition of Initiator The procedure of Example 1 is generally followed except that propoxylated allyl alcohol is not used, and 432 g of allyl alcohol is charged to the reactor initially. The di-tert-butylperoxide initiator is added gradually during the course of the polymerization as described in Example 1. Following removal of monomers by vacuum stripping, the product (121 g) is isolated and characterized. The yield obtained is 28% based on the weight of charged allyl alcohol.

Example 6. Preparation of Poly(methallyl alcohol): Gradual Addition of Initiator The procedure of Example 1 is generally followed except that propoxylated allyl alcohol is not used, and 432 g of methallyl alcohol is charged to the reactor initially. The di-tert-butylperoxide initiator is added gradually during the course of the polymerization as described in Example 1. Following removal of monomers by vacuum stripping, the product (132 g) is isolated and characterized. The yield obtained is 31% based on the weight of charged methallyl alcohol.

Example 7. Preparation of Propoxylated Allyl Alcohol Homopolymer: Gradual Addition of Initiator The procedure of Example 1 is generally followed. The reactor is charged with propoxylated allyl alcohol (average of 1.6 oxypropylene units, 500 g) and di-tert-butylperoxide (15 g). The reactor is purged three times with nitrogen and sealed, and the contents are heated to 165° C. Additional di-tert-butylperoxide (40 g) is continuously added to the reactor over 2 h. Heating continues at 165° C. for 0.5 h after completing the peroxide addition. The mixture is vacuum stripped to remove most of the unreacted monomer, and is then stripped in the presence of water (2%) to remove traces of unreacted monomer at a maximum temperature of 185° C. The product (371 g, 74%), is a homopolymer of propoxylated allyl alcohol and has $Mn=1160$, $Mw=2450$.

The preceding examples are meant only as illustrations; the following claims define the scope of the invention.

We claim:

1. A process for making an allyl polymer or copolymer, said process comprising polymerizing an allyl monomer at a temperature within the range of about 80° C. to about 280° C. in the presence of a free-radical initiator, wherein most or all of the initiator used is gradually added to the reaction mixture during the polymerization, and wherein the conversion of the allyl monomer improves as a result of the gradual addition of the initiator.

2. The process of claim 1 wherein at least about 75% of the initiator used is gradually added to the reaction mixture during the polymerization.

3. The process of claim 1 wherein the conversion of the allyl monomer is at least about 25% greater than the conversion achieved in a similar process in which most or all of the initiator is charged to the reactor at the start of the polymerization.

4. The process of claim 1 wherein the conversion of the allyl monomer is at least about 100% greater than the conversion achieved in a similar process in which most or all of the initiator is charged to the reactor at the start of the polymerization.

5. The process of claim 1 wherein the allyl monomer has the structure:

$CH_2=CR-CH_2-X$ in which R is hydrogen or a $C_1-C_{10}$ alkyl group, and X is a monovalent radical selected from the group consisting of -OH, -OR', -O-CO-R', -O-CO$_2$-R', -(OA)$_n$-OH, -(OA)$_n$-OR', -(OA)$_n$-O-CO-R', and -(OA)$_n$-O-CO$_2$-R' in which R' is a $C_1-C_{10}$ alkyl or $C_6-C_{12}$ aryl group, OA is a $C_2-C_4$ oxyalkylene diradical, and n has a value within the range of about 1 to 5.

6. The process of claim 1 wherein the allyl monomer is one or more allyl monomers selected from the group consisting of allyl alcohol, methallyl alcohol, allyl acetate, allyl butyrate, and propoxylated allyl alcohols.

7. The process of claim 6 wherein the allyl monomer is a mixture of allyl alcohol and propoxylated allyl alcohols.

8. The process of claim 6 wherein the allyl monomer is a mixture of allyl alcohol and allyl acetate.

9. The process of claim 6 wherein the allyl monomer is a mixture of allyl acetate and propoxylated allyl alcohols.

10. The process of claim 1 wherein the free-radical initiator is selected from the group consisting of peroxides and azo compounds.

11. The process of claim 10 wherein the free-radical initiator is di-tert-butyl peroxide.

12. The process of claim 10 wherein the free-radical initiator is tert-butylhydropero xide.

13. The process of claim 1 wherein the amount of free-radical initiator used is greater than about 3 wt. % based on the total weight of polymerizable monomers.

14. The process of claim 1 performed at a temperature within the range of about 135° C. to about 165° C.

15. A process for making an allyl polymer or copolymer, said process comprising polymerizing one or more allyl monomers having the structure:

$CH_2=CR-CH_2-X$ in which R is hydrogen or a $C_1-C_{10}$ alkyl group, and X is a monovalent radical selected from the group consisting of -OH, -OR', -O-CO-R', -O-CO$_2$-R', -(OA)$_n$-OH, -(OA)$_n$-OR', -(OA)$_n$-O-CO-R', and -(OA)$_n$-O-CO$_2$-R' in which R' is a $C_1-C_{10}$ alkyl or $C_6-C_{12}$ aryl group, OA is a $C_2-C_4$ oxyalkylene diradical, and n has a value within the range of about 1 to 5, at a temperature within the range of about 90° C. to about 200° C. in the presence of a free-radical initiator, wherein at least about 75% of the initiator used is gradually added to the reaction mixture during the polymerization, and wherein the conversion of the allyl monomer improves as a result of the gradual addition of the initiator.

16. The process of claim 15 wherein the conversion of the allyl monomer(s) is at least about 100% greater than the conversion achieved in a similar process in which most or all of the initiator is charged to the reactor at the start of the polymerization.

17. The process of claim 15 wherein the free-radical initiator is di-tert-butyl peroxide.

18. The process of claim 15 wherein the free-radical initiator is tertbutylhydropero xide.

19. The process of claim 15 wherein the amount of free-radical initiator used is greater than about 3 wt. % based on the total weight of polymerizable monomers.

20. The process of claim 15 wherein the allyl monomer is one or more allyl monomers selected from the group consisting of allyl alcohol, methallyl alcohol, allyl acetate, allyl butyrate, and propoxylated allyl alcohols.

21. The process of claim 15 performed at a temperature within the range of about 135° C. to about 165° C.

22. A process for making an allyl polymer or copolymer, said process comprising polymerizing one or more allyl monomers selected from the group consisting of allyl alcohol, methallyl alcohol, allyl acetate, allyl butyrate, and propoxylated allyl alcohols, at a temperature within the range of about 135° C. to about 165° C. in the presence of a peroxide initiator selected from the group consisting of di-tert-butylperoxide and tert-butylhydroperoxide, wherein at least about 75% of the initiator used is gradually added to the reaction mixture during the polymerization, and wherein the conversion of the allyl monomer improves as a result of the gradual addition of the initiator.

* * * * *